United States Patent [19]
Bedford

[11] 3,896,378
[45] July 22, 1975

[54] APPARATUS FOR THE MEASUREMENT OF SHORT TIME INTERVALS

[75] Inventor: John Bedford, Wargrave, England

[73] Assignee: Ferranti Limited, Hollinwood, England

[22] Filed: Oct. 26, 1973

[21] Appl. No.: 409,878

[30] Foreign Application Priority Data
Oct. 28, 1972 United Kingdom............... 49796/72

[52] U.S. Cl............................. 324/188; 324/158 R
[51] Int. Cl.² .................... G04F 8/00; G04F 10/00
[58] Field of Search............ 324/158 R, 158 D, 181, 324/188, 73

[56] References Cited
UNITED STATES PATENTS
2,947,943  8/1960  Casey et al..................... 324/158 R OTHER PUBLICATIONS
Scray, IBM Tech. Discl. Bul., April, 1960, p. 47.

*Primary Examiner*—Stanley T. Krawczewicz
*Attorney, Agent, or Firm*—Cameron, Kerkam, Sutton, Stowell & Stowell

[57] ABSTRACT

Apparatus for measuring very short time delays in semiconductor circuits includes two signal sources arranged so that one signal may be delayed relative to the other. The input signals are applied to the circuit under test, and control means are provided to vary the relative time delay until the test circuit reaches a critical state indicative of the time delay to be measured.

12 Claims, 4 Drawing Figures

APPARATUS FOR THE MEASUREMENT OF SHORT TIME INTERVALS

This invention relates to apparatus for the measurement of short time intervals representing the inherent time delays in semiconductor circuits.

The inherent time delays in such circuits may be of considerable importance, particularly in the case of high-speed integrated circuits. For example the so-called "D-type" bistable circuit comprises three cascade-connected bistable circuits and has two inherent delays of importance. The "setup" time is the time for which the correct input signal must be present before the clock pulse switching edge to ensure correct operation, whilst the "hold" time is the time for which the input signal must be retained after the clock pulse switching edge. These times are very short but must be known if the D-type bistable circuit is to be used in high-speed digital circuits.

Methods are known for measuring very short time intervals. One known technique is an analogue technique which requires a capacitor to be charged at a known rate for the duration of the time interval. The voltage across the capacitor at the end of the period may be measured and the time determined. However, this requires some form of analogue-to-digital converter to be provided to give an indication of the time interval being measured. Another common method uses a digital counter driven by a fast and accurate clock pulse generator, and counts the number of pulses generated within the required time interval. At present, circuits of this type have an upper operating frequency limit of about 350MHz, giving a capability of measuring time intervals down to about one nanosecond. It has not hitherto been possible to measure with any reasonable degree of accuracy time intervals shorter than this without using devices such as the "digital readout sampling oscilloscope." This technique, however, requires a large number of samples, say up to a thousand, determined by the resolution of the display.

It is an object of the invention to provide apparatus for the measurement of short time intervals representing the inherent time delays in semiconductor circuits, which does not suffer from the above-mentioned disadvantages.

According to the present invention there is provided apparatus for the measurement of short time intervals representing the inherent time delays in semiconductor circuits, which includes two signal sources operable to apply input signals to a circuit under test, time delay means operable to apply a time delay to one of said two input signals relative to the other input signal, control means operable to sample the output of the circuit under test at a rate not greater than the repetition rate of the input signals and to vary the time delay inserted by the time delay unit in a manner determined by the said output, and display means operable to indicate the duration of the inserted time delay.

The invention will now be described with reference to the accompanying drawings, in which.

Figure 1:
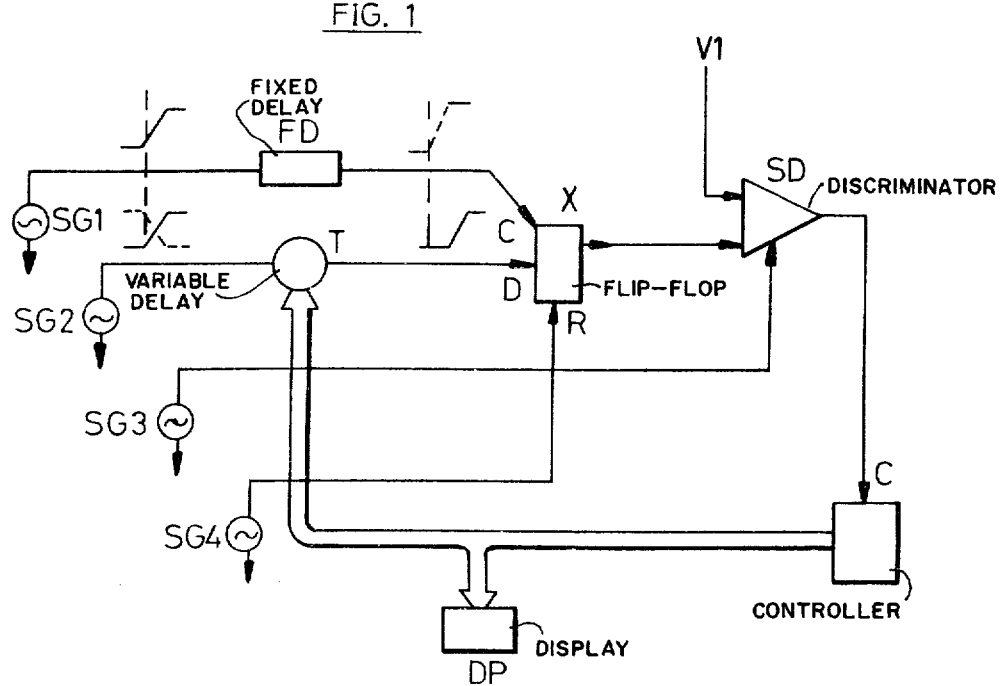
FIG. 1 is a schematic block diagram of a first embodiment of the invention.

Referring now to FIG. 1, this shows a circuit suitable for measuring the "setup" and "hold" times of a D-type bistable circuit. The circuit under test is denoted by the reference X and has a clock signal input C, a data input D and a reset signal input R. The clock signal input is connected through a fixed, known time delay FD to a signal source SG1. A second signal source SG2 is connected through a variable time delay unit T to the data input D of the circuit under test. One output Q of the test circuit is connected to one input of a strobed discriminator SD which has its other input connected to a reference voltage V1. A third signal source SG3 applies a strobe signal to the discriminator, whilst a fourth signal source SG4 is used to reset the test circuit. The discriminator SD is of a commercially available type known to those skilled in the art. One form of pulse discriminator suitable for use in the present invention is manufactured by Advance Micro Devices of California and marketed under its designation AM685-voltage comparator. A somewhat slower variation is available from Texas Instruments marketed under its circuit types SN52510 and SN72510-differential comparators with strobe. The output of the strobed discriminator is applied to a control unit C which is connected to the time delay unit T by way of a multiple-path digital highway. The control unit C is also commercially available through Advance Micro Devices under its designation AM2502/2503/2504 eight-bit/twelve/bit successive approximation registers. An eight-bit register is also commercially available from Motorola in its McMos series, under type numbers MC14549 and MC14559. A display unit DP is also connected to the highway. The strobed discriminator SD and control unit C make up the "control means" referred to above.

The four signal sources produce trains of pulses which are synchronised relative to one another but delayed by a suitable time. The signals from sources SG1 and SG2 occur simultaneously whilst that from SG3 is delayed until the circuit under test has had time to respond. The fourth signal from source SG4 is again delayed on that from SG3 until the state of discriminator SD has been sampled, but before the next pulses from SG1 and SG2 occur.

The delay inserted by time delay unit T is varied under the control of control unit C until a chanage in the output of the circuit under test indicates that the required critical situation has been reached. If the "setup" time is to be measured, the signals from sources SG1 and SG2 are arranged to be of the same polarity. If the signal applied to the data input D occurs to close in time to the clock signal then the test circuit will not change state. Hence there is no input to the strobed discriminator and no signal to the control unit C. This causes the time delay inserted by time delay unit T to be reduced so that the data signal occurs earlier relative to the clock signal. This is repeated until the timing of these two signals is such that the test circuit changes state. The output is applied to the discriminator SD which, when strobed, applies a signal to control unit C to prevent further changes in the time delay. The display unit DP displays the difference in time between the fixed and variable time delay units, this representing the "setup" time of the circuit under test.

To measure the "hold" time of the test circuit, the polarity of the signal applied to the data input D of the test circuit is reversed to represent the end of the data signal. The procedure is as before, except that the time being measured is now the "hold" time of the test circuit.

Figure 2:
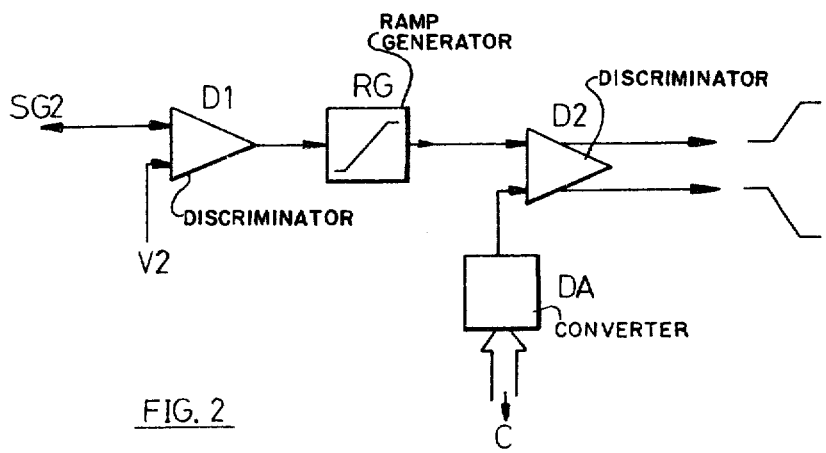
FIG. 2 is a block diagram of part of FIG. 1.

FIG. 2 shows in greater detail the variable time delay unit T of FIG. 1. The signal from source SG2 is applied to a first disciminator D1 along with a fixed reference voltage V2. The output of the discriminator is used to trigger a triggerable ramp generator RG which applies a ramp signal to a second, high-speed, variable-threshold discriminator D2 whose other input is controlled in a stepwise manner by a digital-to-analogue convertor DA driven by the controller C over the data highway. The discriminator D2 may produce either positive-going or negative-going output signals for application to the test circuit.

Figure 3:
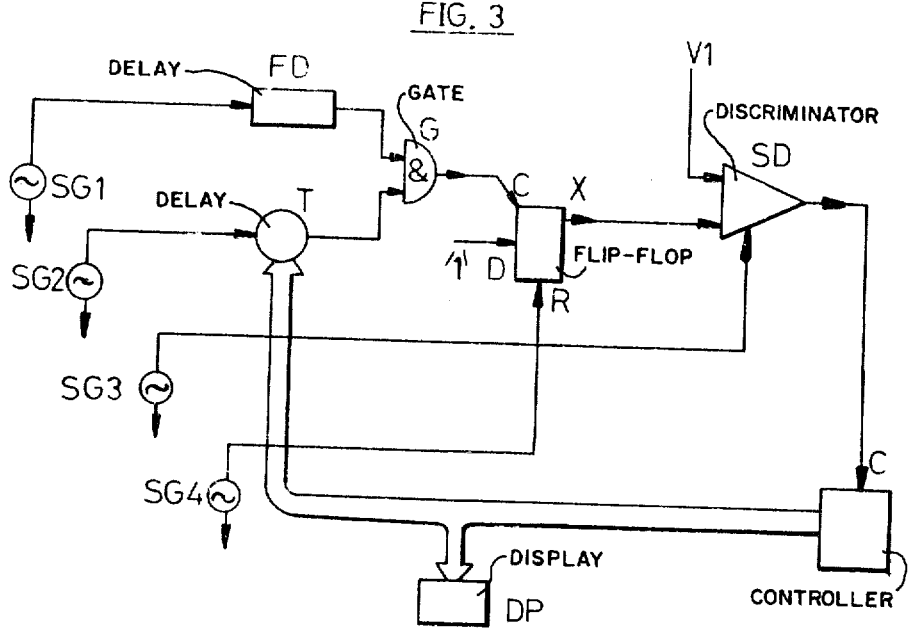
FIGS. 3 and 4 illustrate other embodiments of the invention.

As well as the "setup" and "hold" times of the D-type bistable circuit another important parameter of this type of circuit is the necessary width of the clock pulse itself. FIG. 3 shows an arrangement for measuring this. The arrangement is very similar to that of FIG. 1 except that the data input D of the test circuit is now connected to a fixed voltage representing a digital 1, and the outputs of the two time delay units FD and T are gated together in an AND gate G, the output of which is applied to the clock input C of the test circuit. The variable time delay unit T operates to vary the width of the applied clock pulse until the critical width is detected.

Figure 4:
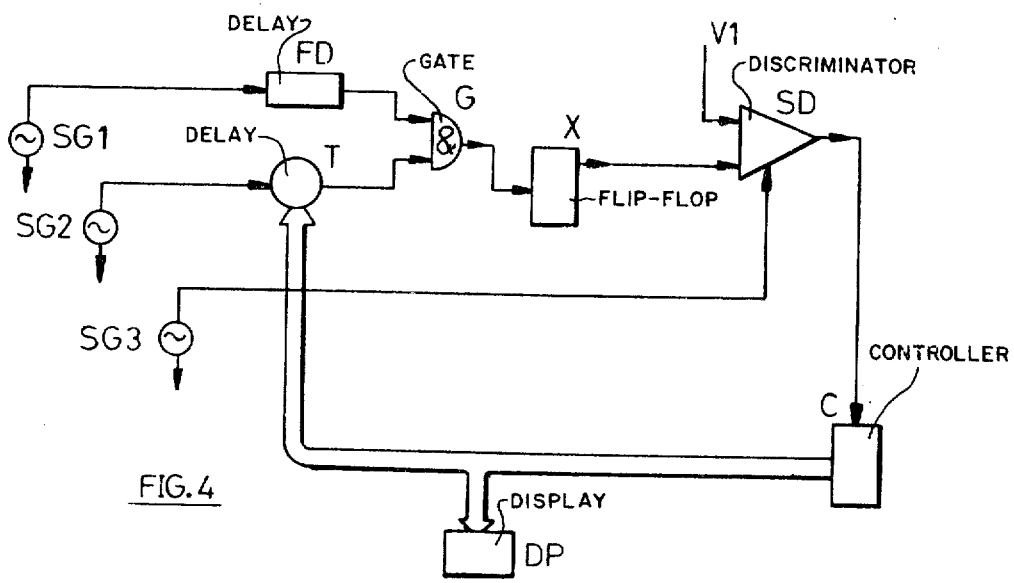

As well as performing measurements on D-type bistable circuits the arrangement may also be used to measure inherent time delays in other types of circuit. FIG. 4 shows the application of the invention to the measurement of the minimum clock pulse width required to trigger a monostable circuit. The arrangement and operation is exactly as for the arrangement of FIG. 3 except that the reset signal from sources SG4 is no longer necessary as the monostable circuit will reset itself. However, the strobed discriminator must, of course, be sampled before the monostable circuit resets.

Many other time delay measurements may be carried out using the invention, and these are not restricted to measurements on digital circuitry. The control of the time delay unit T by the control unit C may be by analogue means.

What we claim is:

1. Apparatus for the measurement of short time intervals representing the inherent time delays in semiconductor circuits, comprising two signals sources operable to apply input signals to a circuit under test, time delay means operable to apply a time delay to one of said two input signals relative to the other of said two input signals, control means operable to sample the output of the circuit under test at a rate not greater than the repetition rate of the input signals and to develop an output for varying the time delay inserted by said time delay means in a manner determined by the said output, display means operable to indicate the duration of the inserted time delay in response to said output and means for applying the output of said control means to said time delay means.

2. Apparatus as claimed in claim 1 in which the time delay means includes a fixed time delay unit having an input connected to one of said two signal sources and a variable time delay unit having an input connected to the other signal source, the outputs of said fixed and said variable time delay units being connected to the circuit under test.

3. Apparatus as claimed in claim 2 in which the variable time delay unit comprises a triggerable ramp generator and a variable-threshold discriminator the threshold level of which is controlled by the output of the control means.

4. Apparatus as claimed in claim 3 in which the control means includes a strobe discriminator operable to sample the output of the circuit under test and a third signal source operable to apply a strobe signal to said strobe discriminator for sampling said output.

5. Apparatus as claimed in claim 4 in which the control means is responsive to changes in the output of the circuit under test to vary the threshold level of the variable-threshold discriminator.

6. Apparatus as claimed in claim 5 in which the control means includes means for generating a digital signal which is passed over a digital highway to an input of the variable threshold discriminator.

7. Apparatus as claimed in claim 6 in which the display means is controlled by the digital signal appearing on the said digital highway.

8. Apparatus for the measurement of short time intervals representing the inherent time delays in semiconductor circuits, comprising means for applying first and second input signals to a circuit under test, time delay means operable to delay one of said two input signals relative to the other input signals, control means operable to sample the output of the circuit under test at a rate not greater than the repetition rate of the input signals and to vary the time delay inserted by the time delay means in a manner determined by the said output, and means operable to indicate the duration of the inserted time delay in response to said output and means for applying the output of said control means to said time delay means.

9. Apparatus as claimed in claim 8 in which the time delay means includes a fixed time delay unit having an input connected to receive one of said first and second input signals and a variable time delay unit having an input connected to receive the other of said first and second input signals, each said time delay unit having an output applied to the circuit under test.

10. Apparatus as claimed in claim 9 in which the variable time delay unit comprises a triggerable ramp generator and a variable-threshold discriminator, said variable-threshold generator having a first input connected to receive the output of said ramp generator and a second input connected to receive an output of the control means to thereby control the threshold level of said ramp generator.

11. Apparatus as claimed in claim 9 in which the control means includes a strobe discriminator operable to sample the output of the circuit under test in response to a third input signal applied to said strobe discriminator.

12. Apparatus as claimed in claim 9 including means for gating the outputs of the delay units and applying the output of said gating means to the circuit under test.

* * * * *